US012404411B2

(12) United States Patent
Ram

(10) Patent No.: US 12,404,411 B2
(45) Date of Patent: Sep. 2, 2025

(54) CONDUCTIVE PASTE BASED ON NANO-HYBRID MATERIALS

(71) Applicant: University of South Florida, Tampa, FL (US)

(72) Inventor: Manoj Kumar Ram, Palm Harbor, FL (US)

(73) Assignee: University of South Florida, Tampa, FL (US)

( * ) Notice: Subject to any disclaimer, the term of this patent is extended or adjusted under 35 U.S.C. 154(b) by 23 days.

(21) Appl. No.: 18/458,504

(22) Filed: Aug. 30, 2023

(65) Prior Publication Data
US 2024/0043695 A1 Feb. 8, 2024

Related U.S. Application Data

(63) Continuation of application No. 17/286,736, filed as application No. PCT/US2019/057240 on Oct. 21, 2019, now Pat. No. 11,773,271.
(Continued)

(51) Int. Cl.
C09D 7/65 (2018.01)
C09C 1/00 (2006.01)
(Continued)

(52) U.S. Cl.
CPC ............ *C09C 3/066* (2013.01); *C09C 1/0003* (2013.01); *C09C 1/44* (2013.01); *C09D 5/24* (2013.01);
(Continued)

(58) Field of Classification Search
CPC ......... C09C 3/066; C09C 1/0003; C09C 1/44; C09D 5/24; C09D 7/62; C09D 7/65;
(Continued)

(56) References Cited

U.S. PATENT DOCUMENTS 7,262,511 B2 8/2007 Osako et al.
9,416,456 B1 8/2016 Ram et al.
(Continued)

FOREIGN PATENT DOCUMENTS

CN 102212210 10/2011
CN 102634265 8/2012
(Continued)

OTHER PUBLICATIONS

International Preliminary Report on Patentability issued for Application No. PCT/US2019/057240, dated Apr. 29, 2021.
(Continued)

*Primary Examiner* — Mark Kopec
*Assistant Examiner* — Jaison P Thomas
(74) *Attorney, Agent, or Firm* — Meunier Carlin & Curfman LLC

(57) ABSTRACT

Hybrid particles having improved electrical conductivity and thermal and chemical stabilities are disclosed. The hybrid particles are for use in conductive pastes. The hybrid particles include a nanoparticle selected from a graphene-containing material, a dichalcogenide material, a conducting polymer, or a combination thereof encapsulated in a conducting metal. The hybrid particles include a nanoparticle selected from a graphene-containing material, a dichalcogenide material, or a combination thereof encapsulated in a conducting polymer, and optionally further in a conducting metal. Suitable conducting metals include nickel or silver. Suitable conducting polymers include polyaniline, polypyrrole, or polythiophene. Suitable dichalcogenide materials include $MoS_2$ or $MoSe_2$. The hybrid particles can further include a conducting polymer layer on an outer surface of the conducting metal. Methods of making the hybrid particles are also disclosed.

14 Claims, 6 Drawing Sheets

Related U.S. Application Data

(60) Provisional application No. 62/747,944, filed on Oct. 19, 2018.

(51) Int. Cl.

| | |
|---|---|
| *C09C 1/44* | (2006.01) |
| *C09C 3/06* | (2006.01) |
| *C09D 5/24* | (2006.01) |
| *C09D 7/40* | (2018.01) |
| *C09D 7/62* | (2018.01) |
| *C09J 9/02* | (2006.01) |
| *C09J 11/04* | (2006.01) |
| *C09J 11/08* | (2006.01) |
| *H01B 1/02* | (2006.01) |
| *H01B 1/12* | (2006.01) |

(52) U.S. Cl.
CPC ............... *C09D 7/62* (2018.01); *C09D 7/65* (2018.01); *C09D 7/70* (2018.01); *C09J 9/02* (2013.01); *C09J 11/04* (2013.01); *C09J 11/08* (2013.01); *H01B 1/02* (2013.01); *H01B 1/127* (2013.01); *C01P 2004/61* (2013.01); *C01P 2004/62* (2013.01); *C01P 2004/64* (2013.01); *C01P 2004/80* (2013.01); *C01P 2006/32* (2013.01); *C01P 2006/40* (2013.01)

(58) Field of Classification Search
CPC ..... C09D 7/70; C09J 9/02; C09J 11/04; C09J 11/08; H01B 1/02; H01B 1/127; C01P 2004/61; C01P 2004/62; C01P 2004/64; C01P 2004/80; C01P 2006/32; C01P 2006/40; H01M 4/00

See application file for complete search history.

(56) References Cited

U.S. PATENT DOCUMENTS

| | | | |
|---|---|---|---|
| 9,684,218 | B2 | 6/2017 | Ram et al. |
| 2003/0056819 | A1 | 3/2003 | Imai et al. |
| 2004/0110052 | A1 | 6/2004 | Srinivas |
| 2010/0140097 | A1 | 6/2010 | Wei et al. |
| 2014/0332071 | A1 | 11/2014 | Jiang et al. |
| 2015/0218391 | A1 | 8/2015 | Takahashi et al. |
| 2016/0109776 | A1 | 4/2016 | Ram et al. |
| 2016/0244577 | A1* | 8/2016 | Zhang ................. C08J 5/18 |
| 2017/0207001 | A1 | 7/2017 | Velia et al. |
| 2019/0033625 | A1 | 1/2019 | Ram et al. |
| 2020/0079993 | A1 | 3/2020 | Ram et al. |
| 2020/0192174 | A1 | 6/2020 | Ram et al. |
| 2021/0193347 | A1* | 6/2021 | Maruyama ............... C09D 7/61 |
| 2022/0274844 | A1 | 9/2022 | Ning et al. |

FOREIGN PATENT DOCUMENTS

| | | | |
|---|---|---|---|
| EP | 1996244 | 1/2012 | |
| WO | WO-2017145940 A1 * | 8/2017 | .......... C01B 32/194 |

OTHER PUBLICATIONS

Abdelmola, et al., Photoelectrochemical cell of hybrid Regioregular poly (3-hexylthiophen, 2, 5, diyl) and molybdenum disulfide film, Surface Review and Letters, (201&):1750026.

Alamro, Turki, and Manoj K. Ram. "Polyethylenedioxythiophene and molybdenum disulfide nanocomposite electrodes for supercapacitor applications." Electrochimica Acta (2017) 623.

Alvi F, Ram MK, Basnayaka PA, Stefanakos E, Goswami Y, Kumar A. Graphene-polyethylenedioxythiophene conducting polymer nanocomposite based supercapacitor. Electrochimica Acta. 2011;56(25):9406-12.

Alvi F, Ram MK, Gomez H, Joshi RK, Kumar A. Evaluating the chemio-physio properties of novel zinc oxide-polyaniline nanocomposite polymer films. Polymer journal. 2010;42(12):935.

Chen C, He Y, Xiao G, Xia Y, Li H, He Z. Two-dimensional hybrid materials: MoS2-RGO nanocomposites enhanced the barrier properties of epoxy coating. Applied Surface Science. 2018;444:511-21.

Elaine Armelin, Carlos Alemán, Jose Ignacio Iribarren, Anticorrosion performances of epoxy coatings modified with polyaniline: A comparison between the emeraldine base and salt forms, Progress in Organic Coatings, vol. 65, Issue 1.

Feng B, Gu X, Zhao X, Zhang Y, Zhang T, Shi J. In situ synthesis of silver/chemically reduced graphene nanocomposite and its use for low temperature conductive paste. Journal of Materials Science: Materials in Electronics. 2017;28(11):7686-91.

Gautam V, Singh KP, Yadav VL. Preparation and characterization of green-nano-composite material based on polyaniline, multiwalled carbon nano tubes and carboxymethyl cellulose: For electrochemical sensor applications. Carbohydrate polymers. 2018;189:218-28.

Giambrone, et al., Comparative photoelectrochemical studies of regioregular polyhexylthiophene with microdiamond, nanodiamond and hexagonal boron nitride hybrid films, Thin Solid Films, 615 (2016) 226-232.

Goli P, Legedza S, Dhar A, Salgado R, Renteria J, Balandin AA. Graphene-enhanced hybrid phase change materials for thermal management of Li-ion batteries. Journal of Power Sources. 2014;248:37-43.

Gomez H, Ram MK, Alvi F, Stefanakos E, Kumar A. Novel Synthesis, Characterization, and Corrosion Inhibition Properties of Nanodiamond-Polyaniline Films. The Journal of Physical Chemistry C. 2010; 114(44):18797-804.

Gómez H, Ram MK, Alvi F, Villalba P, Stefanakos EL, Kumar A. Graphene-conducting polymer nanocomposite as novel electrode for supercapacitors. Journal of Power Sources. 2011; 196(8):4102-8.

Hu Y, Zhao T, Zhu P, Liang X, Zhu Y, Su H, et al., editors. Water-dispersible graphene paste for flexible conductive patterns and films. Electronic Packaging Technology (ICEPT), 2016 17th International Conference on; 2016: IEEE.

Hu Y, Zhao T, Zhu P, Zhu Y, Shuai X, Liang X, et al. Low cost and highly conductive elastic composites for flexible and printable electronics. Journal of Materials Chemistry C. 2016;4(24):5839-48.

Huang X, Tan C, Yin Z, Zhang H. 25th Anniversary Article: Hybrid Nanostructures Based on Two-Dimensional Nanomaterials. Advanced Materials. 2014;26(14):2185-204.

Jia W, Tchoudakov R, Segal E, Joseph R, Narkis M, Siegmann A. Electrically conductive composites based on epoxy resin with polyaniline-DBSA fillers. Synthetic metals. 2003; 132(3):269-78.

Lin J-M, Chen W-N, Lin C-Y, Lin C-F, Chang J-C, editors. A novel highly electrically conductive silver paste. Electronics Packaging (ICEP), 2016 International Conference on; 2016: IEEE.

Manoj K Ram, M. Salerno, M. Adami, P. Faraci, C. Nicolini, Physical properties of polyaniline films: assembled by the layer-by-layer technique, Langmuir, 15 (1999) 1252-1259.

Manoj K. Ram, N. S. Sundaresan and B. D. Malhotra Performance of Electrochromic Cells of Polyaniline in Polymeric Electrolyte, J. Material & Science Letters, 13, (1994), 1490-1493.

Prabakar SR, Hwang Y-H, Bae EG, Lee DK, Pyo M. Graphene oxide as a corrosion inhibitor for the aluminum current collector in lithium ion batteries. Carbon. 2013;52:128-36.

Ram MK, Gomez H, Alvi F, Stefanakos E, Goswami Y, Kumar A. Novel nanohybrid structured regioregular polyhexylthiophene blend films for photoelectrochemical energy applications. The Journal of Physical Chemistry C. 2011; 115(44):21987-95.

Sedaghat, Manoj K Ram, A. Zayed, R. Kamal, N. Shanahan, Investigation of physical properties of graphene-cement composite for structural applications, Open Journal of Composite Materials, 4 (2014) 12-21.

Senthilvasan PA, Rangarajan M, editors. Corrosion inhibition properties of graphene oxide on mild steel in 3.5% NaCl. IOP Conference Series: Materials Science and Engineering; 2016: IOP Publishing.

Wang H, Yu L, Lee Y-H, Shi Y, Hsu A, Chin ML, et al. Integrated circuits based on bilayer MoS2 transistors. Nano letters. 2012; 12(9):4674-80.

(56) References Cited

OTHER PUBLICATIONS

Yavuz Ö, Ram MK, Aldissi M, Poddar P, Srikanth H. Polypyrrole composites for shielding applications. Synthetic Metals. 2005;151(3):211-7.
Yavuz, et al., Synthesis and the physical properties of MnZn ferrite and NiMnZn ferrite-polyaniline nanocomposite particles, Journal of Materials Chemistry, 15 (2005) 810-817.
International Search Report and Written Opinion in PCT/US2019/057240. Mailed Jan. 6, 2020. 16 pages.
Patole et al. Carbon nanotubes with silver nanoparticle decoration and conductive polymer coating for improving the electrical conductivity of polycarbonate composites. vol. 81, Jan. 2015.

* cited by examiner

CONDUCTIVE PASTE BASED ON NANO-HYBRID MATERIALS

CROSS-REFERENCE TO RELATED APPLICATIONS

This application claims the benefit of and priority to U.S. Provisional Application Ser. No. 62/747,944 filed on Oct. 19, 2018, the disclosure of which is expressly incorporated herein by reference in its entirety.

BACKGROUND

Silver paste is highly conductive and generally consists of silver particles, a thermoplastic resin, and a dispersant. The conventional silver paste, however, is very expensive due to the high cost of silver and scarcity of the materials. Pastes containing copper or nickel have been developed and show appreciable conductivity but loses stability over time. Graphene and silver containing pastes have been found to have high conductivity and better stability.

There is a need for conductive pastes comprising materials that are cost effective and have good compatibility, conductivity, stability, adhesion, and corrosion resistance. The materials and methods disclosed herein address these and other needs.

SUMMARY

In accordance with the purposes of the disclosed materials and methods, as embodied and broadly described herein, the disclosed subject matter, in one aspect, relates to hybrid particles having improved electrical conductivity and thermal and chemical stabilities. The disclosed hybrid particles can be used in a conductive paste, a sensor application, for sunlight control, catalytic activity, non-linear optical effect, antibacterial activity, or stretchable electronics applications. In some examples, the hybrid particles can be used in conductive pastes, preferably as a partial or complete replacement of silver in silver conducting pastes.

In some aspects, the hybrid particles are in the form of core-shell particles. The hybrid core-shell particles can comprise a nanoparticle core selected from a graphene-containing material, a dichalcogenide material, a conducting polymer, or a combination thereof and a shell at least partially surrounding the nanoparticle core, wherein the shell comprises a conducting metal. In other aspects, the hybrid core-shell particles can comprise a nanoparticle selected from a graphene-containing material, a dichalcogenide material, or a combination thereof encapsulated in a conducting polymer. Suitable graphene-containing materials include graphene, graphene oxide, carbon nanoparticles including carbon nanotubes, or a combination thereof. Suitable dichalcogenide materials include molybdenum disulphide, molybdenum diselenide, molybdenum ditelluride, tungsten disulphide, tungsten diselenide, tungsten ditelluride, titanium diselenide, titanium disulphide, titanium ditelluride, zirconium disulphide, zirconium diselenide, zirconium ditelluride, tin disulphide, tin diselenide, tantalum disulphide, tantalum diselenide, vanadium tantalum ditelluride, or a combination thereof. Suitable conducting metals include nickel, silver, or combinations thereof. Suitable conducting polymers include polyaniline, polypyrrole, polythiophene, poly(ortho-anisidine), poly(methyl aniline), poly (o-ethoxyaniline), poly (o-toluidine) (POT), poly (ethoxyaniline), substituted polyaniline, substituted polypyrrole, polyindole, polyethylenedioxythiophene (PEDOT), polycarbazole, substituted polycarbazole, polyaniline-polypyrrole copolymers, polyaniline-polythiophene copolymers, blends thereof, or copolymers thereof.

In certain embodiments, the nanoparticle core is selected from a graphene-containing material or a dichalcogenide material. Accordingly, the hybrid core-shell particles can include a nanoparticle core selected from a graphene-containing material or a dichalcogenide material and a shell comprising a conducting metal. In these examples, the hybrid core-shell particles can further include a conducting polymer layer on an outer surface of the shell.

Representative examples of hybrid core-shell particles disclosed herein include graphene oxide-nickel particles, graphene-nickel particles, molybdenum disulphide-nickel particles, graphene oxide-silver particles, graphene-silver particles, molybdenum disulphide-silver particles, graphene oxide-nickel-conducting polymer particles, graphene-nickel-conducting polymer particles, molybdenum disulphide-nickel-conducting polymer particles, graphene oxide-silver-conducting polymer particles, graphene-silver-conducting polymer particles, and molybdenum disulphide-silver-conducting polymer particles.

In the hybrid core-shell particles, the core can comprise from 20-80 wt %, from 30-70 wt %, or from 30-60 wt %, of the particle; and/or the shell comprises from 20-80 wt %, from 30-70 wt %, or from 30-60 wt %, of the particle. The particles can have an average particle size of from 50 nm to 10 microns, from 100 nm to 5 microns, or from 100 nm to 2 microns.

As described herein, the hybrid core-shell particles can be used in conducting pastes. The hybrid core-shell particles can be present in an amount of 50 wt % or greater, from 50-90 wt %, or from 70-85 wt %, of the composition. In addition to the hybrid core-shell particles, the conducting pastes can further include a dispersant or surfactant (for example, propylene carbonate, polyoxy ethylene-p-(1,1,3,3-tetramethylbutyl) phenyl ethers, X-triton, n-methyl pyrrolidinone, ionic liquid, diethylene glycol monobutyl ether, polyvinyl alcohol, and such the like), an adhesive material, or a combination thereof. Suitable adhesive materials include an epoxy resin, a vinyl ester resin, a polystyrene resin, an acrylic resin, a polyamide resin, a polyamide-amine resin, a carboxyl group-containing resin, or a combination thereof. The adhesive can be present in an amount of 50 wt % or less, from 10-50 wt %, or from 15-30 wt %, of the composition.

As described herein, the conductive pastes described herein provides a cost effective paste with good compatibility, conductivity, stability, adhesion, and corrosion resistance compared to conventional silver pastes. In some embodiments, the conductive pastes disclosed herein comprise less than 10 wt % of silver, or is substantially free of silver.

Methods of making the hybrid core-shell particles are also disclosed. The method can include depositing a conducting metal and/or a conducting polymer on a surface of the nanoparticle. Deposition of the conducting metal or conducting polymer can be by electrochemical deposition or by other methods known to those skilled in the art.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
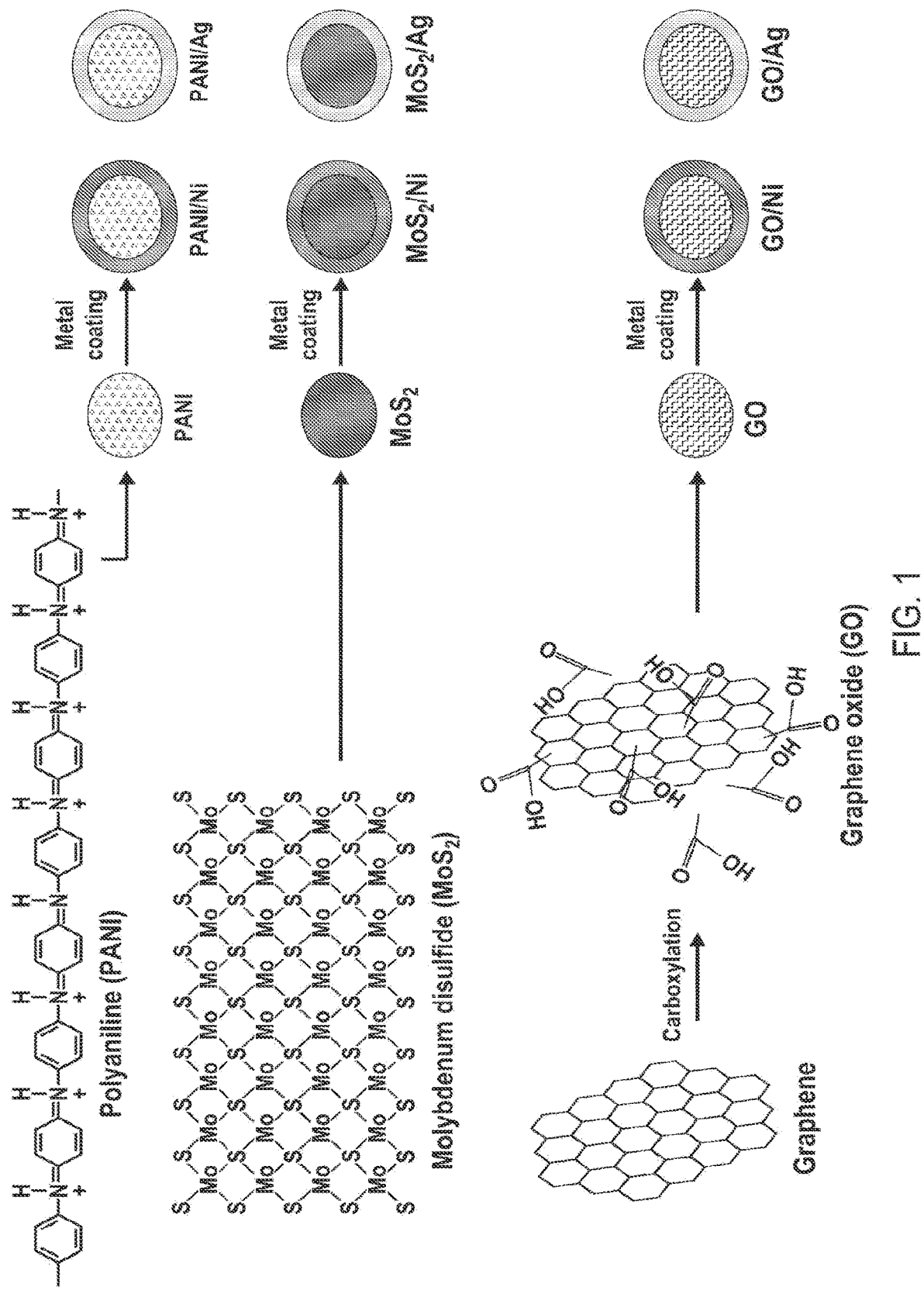
FIG. 1 shows schematic drawings showing the structure of polyaniline (PANI), graphene oxide, and molybdenum disulfide ($MoS_2$) nanomaterials coated with nickel or silver.

The materials, compounds, compositions, and methods described herein may be understood more readily by reference to the following detailed description of specific aspects of the disclosed subject matter, the Figures, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a polymer" includes mixtures of two or more such polymers, and the like.

"Optional" or "optionally" means that the subsequently described event or circumstance can or cannot occur, and that the description includes instances where the event or circumstance occurs and instances where it does not.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

As used herein, the term "composition" is intended to encompass a product comprising the specified ingredients in the specified amounts, as well as any product which results, directly or indirectly, from combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5 and are present in such ratio regardless of whether additional components are contained in the mixture.

Compositions

Hybrid particles having enhanced electrical conductivity, corrosion resistance, and thermal and chemical stabilities are disclosed herein. The term "hybrid" as used herein refers to a particle comprising at least two components. Suitable components include two or more materials selected from a nanoparticle, a conducting metal, or a conducting polymer as described herein. Compositions containing the hybrid particles are also disclosed. The hybrid particles can be used as a replacement for silver in conventional silver conducting pastes.

In some aspects, the hybrid particles include a nanoparticle encapsulated within a conducting metal. In other aspects, the hybrid particles include a nanoparticle encapsulated within a conducting polymer. The term "encapsulated" as used herein refers to the nanoparticle (core) being partially or completely surrounded by the conducting metal or conducting polymer (shell) in which it is encapsulated. The nanoparticle preferably includes a 2-dimensional (2D) layered structure and is also a conducting material. The term "nanoparticle" as used herein refers to any structure whose primary average particle size is less than 1 micron, preferably less than 500 nm, such as less than 350 nm in one dimension. For example, a nanoparticles can comprise a nanowire, nanotube, nanorod, spherical nanoparticle, nanopore, and the like, or combinations thereof. As such, the term nanoparticle can comprise, for example, a nanowire, nanotube, nanorod, spherical nanoparticle, nanopore, or a combination thereof. The nanoparticle can be a 2D (such as a flake) or a 3D (such as a sphere) particle. Particle size can be measured by Dynamic Light Scattering (DLS) and Transmission Electron Microscopy (TEM). In some examples, the nanoparticles can have an average particle size of 0.5 nm to less than 1000 nm. For example, the nanoparticles can have an average particle size of from 0.5 nm to 500 nm, from 0.5 nm to 300 nm, from 0.5 nm to 200 nm, from 0.5 nm to 100 nm, from 0.5 nm to 75 nm, from 0.5 nm to 50 nm, from 0.5 nm to 40 nm, from 0.5 nm to 30 nm, from 0.5 nm to 15 nm, from 0.5 nm to 10 nm, from 0.5 nm to 5 nm, 1 nm to 500 nm, from 1 nm to 300 nm, from 1 nm to 200 nm, from 1 nm to 50 nm, from 1 nm to 40 nm, from 1 nm to 30 nm, from 1 nm to 15 nm, from 1 nm to 10 nm, from 1 nm to 5 nm, 2 nm to 500 nm, from 2 nm to 300 nm, from 2 nm to 200 nm, from 2 nm to 50 nm, from 2 nm to 40 nm, from 2 nm to 30 nm, from 2 nm to 15 nm, from 2 nm to 10 nm, or from 2 nm to 5 nm.

In preferred examples, the nanoparticle can include a graphene-containing material, a dichalcogenide material, or a conducting polymer. Graphene is a two-dimensional hexagonal lattice honeycomb structure and includes $sp^2$ carbon atoms. Graphene has excellent electrical conductivity and mechanical properties. Graphene also has excellent chemical and thermal properties, high electrical conductivity, high surface area, and high mechanical strength properties. The graphene-containing material can include graphene nanoparticles, graphene oxide nanoparticles, or a combination thereof.

The graphene nanoparticles can include both single-atom-thick planar sheets of $sp^2$ hybridized carbon as well as materials comprising two or more stacked layers of such sheets. The planar sheets of $sp^2$ hybridized carbon may form an essentially hexagonal lattice. Similarly, the graphene oxide nanoparticles can include single-atom thick planar sheets of graphite oxide as well as materials comprising two or more stacked layers of such sheets. In some embodiments, the graphene nanoparticles or the graphene oxide nanoparticles can comprise single sheets, two sheets, three sheets, four sheets, five sheets, six sheets, seven sheets, eight sheets, nine sheets, and/or ten sheets of the single-atom thick planar sheet. The graphene oxide nanoparticles can be derived from oxidizing carbonaceous materials having small (nanometer scale) graphite crystalline domains. Examples of carbonaceous materials include mesoporous carbons, graphitized mesoporous carbons, carbon black, conductive carbon black, activated carbon, black carbon (soot), and the like.

In further examples, the nanoparticle can include carbon nanoparticles including carbon nanotubes. Examples of carbon nanotubes include single-walled carbon nanotubes (SWCNTs) and multi-walled carbon nanotubes (MWCNTs), and combinations thereof.

As described herein, the nanoparticle can include a dichalcogenide material. U.S. Patent Publication No. 2003/0056819 discloses conventional dichalcogenide materials having a two-dimensional layered structure. In some embodiments, the dichalcogenide materials can be represented by Formula $A_xBC_{2-y}$, where $0 \le x \le 2$ and $0 \le y < 1$, wherein A comprises at least one element selected from the group consisting of Li, Na, K, Rb, Cs, Mg, Ca, Sr, Ba, Ti, V, Cr, Mn, Fe, Co, Ni, Cu, Zn, Zr, Nb, Mo, Ru, Rh, Pd, Ag, Cd, Hf, Ta, W, Re, Ir, Pt, Au, Sc, Y, and a rare earth element, B comprises at least one element selected from the group consisting of Ti, V, Cr, Zr, Nb, Mo, Hf, Ta, W, Ir, and Sn, and C comprises one of S, Se, and Te. In some examples, the dichalcogenide material can include molybdenum disulphide, molybdenum diselenide, molybdenum ditelluride, tungsten disulphide, tungsten diselenide, tungsten ditelluride, titanium diselenide, titanium disulphide, titanium ditelluride, zirconium disulphide, zirconium diselenide, zirconium ditelluride, tin disulphide, tin diselenide, tantalum disulphide, tantalum diselenide, vanadium tantalum ditelluride, or a combination thereof.

As further described herein, the nanoparticle can include a conducting polymer. The conducting polymer can include a conjugated polymer whose electrical and optical properties can be controllably varied. Through a chemical "doping" process, it is possible to systematically vary the electrical conductivity of these materials from the insulating state to the conducting state. Representative conducting polymers can include polyacetylene (for example, trans-polyacetylene, cis-type polyacetylene, polydiacetylene), polyaniline, polypyrrole (for example, polypyrrole, poly-3-methylpyrrole and poly-3-octyl pyrrole), polythiophene (for example, polythiophene, poly(3-alkylthiophene), poly(3-thiophene-β-ethane sulfonic acid, polyalkylene dioxythiophene (such as polyethylenedioxythiophene), and complexes thereof with polystyrene sulfonate), poly(phenylene) (for example, poly (p-phenylene), poly(m-phenylene), poly(phenylene sulfide), and poly(phenylenevinylene)), poly(ortho-anisidine), poly (o-toluidine) (POT), polyindole, polycarbazole, substituted polyanilines (for example, poly(methyl aniline), poly (methoxy aniline), and poly(ethoxy aniline)), substituted polypyrrole, substituted polycarbazole, polyaniline-polypyrrole copolymers, polyaniline-polythiophene copolymers, poly(vinyl sulfide) (for example, poly(p-phenylene sulfide) and poly(thienylene vinylene), blends thereof, or copolymers thereof.

Conducting metals are known in the art and can be selected from gold, silver, copper, platinum, palladium, nickel, aluminum, or an alloy consisting of two or more metals. Preferably, the conducting metal includes silver or nickel. In some examples, the conducting metal does not include silver.

The hybrid particles disclosed herein can have a core-shell structure.

The term "core-shell" as used herein refers to particles comprising a core material (for example a nanoparticle selected from a graphene-containing nanoparticle, a dichalcogenide material, or a conducting polymer) and shell material (for example a conducting material selected from a conducting metal, a conducting polymer, or a combination thereof). In some embodiments, the shell material can include one or more layers. For example, the shell material can include a layer comprising the conducting metal only, a layer comprising the conducting polymer only, or an inner shell layer comprising the conducting metal and an outer shell layer comprising the conducting polymer.

In some examples, the hybrid core-shell particles can include a nanoparticle core comprising a graphene-containing nanoparticle, a dichalcogenide material, or a conducting polymer and a shell comprising a conducting metal. In other examples, the hybrid core-shell particles can include a nanoparticle core comprising a graphene-containing nanoparticle, a dichalcogenide material, an inner shell layer comprising a conducting metal, and an outer shell layer comprising a conducting polymer. Without wishing to be bound by theory, the conducting polymer in the outer shell facilitates dispersion of the particles, thereby allowing the particles to be easily and well dispersed in a binder, such as in an epoxy resin. The conducting polymer also allows the particles to be easily applied to surfaces and provides corrosion resistance in compositions comprising the same.

In the hybrid core-shell particles, the core can comprise 20% by weight or greater of the particle (e.g., 20% by weight or greater, 25% by weight or greater, 30% by weight or greater, 35% by weight or greater, 40% by weight or greater, 45% by weight or greater, 50% by weight or greater, 55% by weight or greater, 60% by weight or greater, 65% by weight or greater, 70% by weight or greater, 75% by weight or greater, 80% by weight or greater, or 85% by weight or greater, by weight of the particle.) In some embodiments of the hybrid core-shell particles, the core can comprise 80% by weight or less of the particle (e.g., 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less, by weight of the particle.) In some embodiments of the hybrid core-shell particles, the core can comprise from 10-90 wt %, of the particle (e.g., from 20-90 wt %, from 20-85 wt %, from 20-80 wt %, from 30-85 wt %, from 30-80 wt %, from 30-75 wt %, from 30-70 wt %, from 20-60 wt %, from 30-60 wt %, from 30-50 wt %, from 20-50 wt %, by weight of the particle.)

In the hybrid core-shell particles, the shell can comprise 20% by weight or greater of the particle (e.g., 20% by weight or greater, 25% by weight or greater, 30% by weight or greater, 35% by weight or greater, 40% by weight or greater, 45% by weight or greater, 50% by weight or greater, 55% by weight or greater, 60% by weight or greater, 65% by weight or greater, 70% by weight or greater, 75% by weight or greater, 80% by weight or greater, or 85% by weight or greater, by weight of the particle.) In some embodiments of the hybrid core-shell particles, the shell can comprise 80% by weight or less of the particle (e.g., 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less, by weight of the particle.) In some embodiments of the hybrid core-shell particles, the shell can comprise from 10-90 wt %, of the particle (e.g., from 20-90 wt %, from 20-85 wt %, from 20-80 wt %, from 30-85 wt %, from 30-80 wt %, from 30-75 wt %, from 30-70 wt %, from 20-60 wt %, from 30-60 wt %, from 30-50 wt %, from 20-50 wt %, by weight of the particle.)

Representative examples of the hybrid core-shell particles disclosed herein can include graphene oxide (core)-nickel (shell) particles, graphene (core)-nickel (shell) particles, molybdenum disulphide (core)-nickel (shell) particles, graphene oxide (core)-silver (shell) particles, graphene (core)-silver (shell) particles, molybdenum disulphide (core)-silver (shell) particles, graphene oxide (core)-nickel (inner shell)-conducting polymer (outer shell) particles, graphene (core)-nickel (inner shell)-conducting polymer (outer shell) particles, molybdenum disulphide (core)-nickel (inner shell)-conducting polymer (outer shell) particles, graphene oxide (core)-silver (inner shell)-conducting polymer (outer shell) particles, graphene (core)-silver (inner shell)-conducting polymer (outer shell) particles, or molybdenum disulphide (core)-silver (inner shell)-conducting polymer (outer shell) particles.

The hybrid core-shell particles can be sized as nanoparticles or microparticles. In some examples, the hybrid core-shell particles can have an average particle size of 50 nm or greater, 70 nm or greater, 80 nm or greater, 100 nm or greater, 150 nm or greater, 200 nm or greater, 500 nm or greater, 750 nm or greater, 1 micron or greater, 2 microns or greater, 3 microns or greater, or 5 microns or greater. In some examples, the hybrid core-shell particles can have an average particle size of 10 microns or less, 9 microns or less, 8 microns or less, 7 microns or less, 6 microns or less, 5 microns or less, 4 microns or less, 3 microns or less, 2 microns or less, 1 micron or less, 900 nm or less, 800 nm or less, 700 nm or less, 600 nm or less, 500 nm or less, 400 nm or less, 300 nm or less, 200 nm or less, or 100 nm or less. For example, the hybrid core-shell particles can have an average particle size of from 50 nm to 10 microns, from 50 nm to 9 microns, from 50 nm to 8 microns, from 50 nm to 6 microns, from 50 nm to 5 microns, from 50 nm to 4 microns, from 50 nm to 3 microns, from 50 nm to 2 microns, from 50 nm to 1 micron, from 100 nm to 10 microns, from 100 nm to 9 microns, from 100 nm to 8 microns, from 100 nm to 6 microns, from 100 nm to 5 microns, from 100 nm to 4 microns, from 100 nm to 3 microns, from 100 nm to 2 microns, from 100 nm to 1 micron, from 200 nm to 10 microns, from 200 nm to 9 microns, from 200 nm to 8 microns, from 200 nm to 6 microns, from 200 nm to 5 microns, from 200 nm to 4 microns, from 200 nm to 3 microns, from 200 nm to 2 microns, from 200 nm to 1 micron, from 500 nm to 10 microns, from 500 nm to 9 microns, from 500 nm to 8 microns, from 500 nm to 6 microns, from 500 nm to 5 microns, from 500 nm to 4 microns, from 500 nm to 3 microns, from 500 nm to 2 microns, from 500 nm to 1 micron, from 1 micron to 10 microns, from 2 micron to 10 microns, from 4 micron to 10 microns, from 5 micron to 10 microns, from 1 micron to 8 microns, from 2 microns to 8 microns, or from 2 microns to 5 microns.

Compositions comprising the hybrid particles are also disclosed herein. For example, composition comprising the hybrid core-shell particles can be provided in a conductive paste, a sensor application, for sunlight control, catalytic activity, non-linear optical effect, antibacterial activity, or stretchable electronics applications.

In the compositions provided herein, the hybrid core-shell particles can be present in an amount of 25% by weight or greater of the compositions (e.g., 30% by weight or greater, 35% by weight or greater, 40% by weight or greater, 45% by weight or greater, 50% by weight or greater, 55% by weight or greater, 60% by weight or greater, 65% by weight or greater, 70% by weight or greater, 75% by weight or greater, 80% by weight or greater, 85% by weight or greater, or 90% by weight or greater, by weight of the composition.) In some embodiments, the hybrid core-shell particles can be present in an amount of 90% by weight or less of the composition (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, or 20% by weight or less, by weight of the composition.) In some embodiments, the hybrid core-shell particles can be present in an amount of from 20-90 wt %, of the composition (e.g., from 20-85 wt %, from 30-85 wt %, from 40-85 wt %, from 40-75 wt %, from 50-90 wt %, from 50-85 wt %, from 50-80 wt %, from 60-75 wt %, from 70-90 wt %, or from 70-85 wt %, by weight of the composition.)

In some examples, the compositions can be in the form of a conductive pastes. In addition to the hybrid particles disclosed herein, the conductive pastes can further comprise a dispersant or surfactant, an adhesive material, or a combination thereof. Suitable dispersants/surfactants include propylene carbonate, polyoxy ethylene-p-(1,1,3,3-tetramethylbutyl) phenyl ethers, X-triton, n-methyl pyrrolidinone, ionic liquid, diethylene glycol monobutyl ether, polyvinyl alcohol, and such the like. Suitable adhesive materials include an epoxy resin, a vinyl ester resin, a polystyrene resin, an acrylic resin, a polyamide resin, a polyamide-amine resin, a carboxyl group-containing resin, or a combination thereof.

In the compositions provided herein, the adhesive can be present in an amount of 50% by weight or less of the composition (e.g., 45% by weight or less, 40% by weight or less, 35% by weight or less, 30% by weight or less, 25% by weight or less, 20% by weight or less, 15% by weight or less, or 10% by weight or less, by weight of the composition). In some embodiments, the adhesive can be present in an amount of 5% by weight or greater of the compositions (e.g., 10% by weight or greater, 15% by weight or greater, 18% by weight or greater, 20% by weight or greater, 22% by weight or greater, 25% by weight or greater, 28% by weight or greater, 30% by weight or greater, 35% by weight or greater, 40% by weight or greater, 45% by weight or greater, or 50% by weight or greater, by weight of the composition.) In some embodiments, the adhesive can be present in an amount of from 10-50 wt %, of the composition (e.g., from 10-40 wt %, from 10-30 wt %, from 15-50 wt %, from 15-45 wt %, from 15-40 wt %, from 15-35 wt %, from 15-30 wt %, from 20-45 wt %, from 20-35 wt %, or from 20-30 wt %, by weight of the composition).

As described herein, the hybrid particles can be used for example in conductive pastes for partial or complete replacement of silver in silver conducting pastes. The conductive pastes disclosed herein can comprise less than 20% by weight silver (e.g., less than 18% by weight, less than 15% by weight, less than 14% by weight, less than 13% by weight, less than 12% by weight, less than 10% by weight, less than 9% by weight, less than 8% by weight, less than 7% by weight, less than 6% by weight, less than 5% by weight, less than 4% by weight, less than 3% by weight, less than 2% by weight, or less than 1% by weight, of the composition). In some examples, the conductive paste is substantially free of silver.

The compositions exhibit high electrical resistivity, and high thermal and chemical stabilities at room temperature. For example, the compositions described herein can exhibit an electrical resistivity of at least $1 \times 10^{-5}$ ohm·cm (for example, greater than $1 \times 10^{-5}$ ohm·cm, greater than $2 \times 10^{-5}$ ohm·cm, or greater than $3 \times 10^{-5}$ ohm·cm). In some examples, the compositions described herein can exhibit a thermal conductivity of at least 8 W/mK (for example, greater than 8 W/mK, greater than 9 W/mK, or greater than 10 W/mK).

Methods

Methods of making and using the hybrid particles are also disclosed herein. The method of making the hybrid particles can include depositing a conducting metal on a surface of a nanoparticle. As described herein, the nanoparticle can include a graphene-containing material, a dichalcogenide material, a conducting polymer, or a combination thereof. In embodiments where the nanoparticle includes a graphene-containing material or a dichalcogenide material, the method disclosed herein can further comprise depositing a conducting polymer on an outer surface of the conducting metal.

The graphene-containing material, dichalcogenide material, and/or conducting polymer can be commercially obtained or synthesized. Methods for preparing the dichalcogenide material can comprise a hydrothermal process that includes varying the amount of solvent. In specific examples, a salt of A in the Formula $A_xBC_{2-y}$ (such as sodium molybdate) can be mixed with a sulfur-, selenium-, or tellurium-containing compound (such as thioacetamide) in the solvent water. The resulting solution can be heated above at 100° C. or above 150° C. for a period of time (such as at 200° C. for 12 hrs) to obtain the dichalcogenide material, the dichalcogenide material can be purified by centrifugation. In another specific examples, a salt of A in the Formula $A_xBC_{2-y}$ (such as sodium molybdate) can be mixed with a sulfur-, selenium-, or tellurium-containing compound (such as thioacetamide) in a solvent mixture comprising water and ethylene glycol. The solvent mixture can comprise water and ethylene glycol in an amount of from 1:5 to 5:1 by volume, from 1:2 to 2:1 by volume, or from 1:2 to 1:1 by volume. The resulting solution can be heated above at 100° C. or above 150° C. for a period of time (such as at 200° C. for 24 hrs) to obtain the dichalcogenide material, the dichalcogenide material can be purified by centrifugation.

Depositing the conducting metal or conducting polymer can be by electrochemical deposition or by any other method known to those skilled in the art. Suitable set-up for electrochemical deposition can include cell in which a container made of steel acts as an anode electrode. A potential can be applied above the redox potential of the conducting metal (for example, $NiCl_2$ or $AgNO_3$ can be used to deposit nickel and silver, respectively) or the conducting monomer (for example aniline can be used to deposit polyaniline). During electrolysis, the solution can be stirred after each 1 to 2 minutes. The time period for deposition can be optimized with scanning electron microscopy (SEM) and/or conductivity measurements of the deposited particle. The hybrid particles (such as PANI/Ni, $MoS_2$/Ni/PANI, GO/Ni/PANI. $MoS_2$/Ag, GO/Ag) can be characterized using scanning electron microscopy, X-ray diffraction and energy-dispersive (ED) analysis.

In some embodiments, the conducting polymer can be deposited by chemical synthesis. For example, the method can include dispersing the nanoparticle (for example graphene oxide or $MoS_2$) in a polyanion such as a sodium salt of polystyrene sulfonate (PSS). The polyanion allows each particle to be functionalize which aids coating of the conducting polymer. The $MoS_2$/PSS and graphene oxide/PSS particle structures arm shown in FIG. 4. The $MoS_2$/PSS and graphene oxide/PSS particles can be dispersed in dodecyl benzene sulfonic acid. A conducting polymer such as polyaniline can be polymerized over the treated nanoparticles.

The hybrid particles can be used in conductive pastes. In some examples, the hybrid particles can be used as a partial or complete replacement of silver in silver conducting pastes.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1: Conductive Paste Based on Nano-Hybrid Materials

Figure 2:
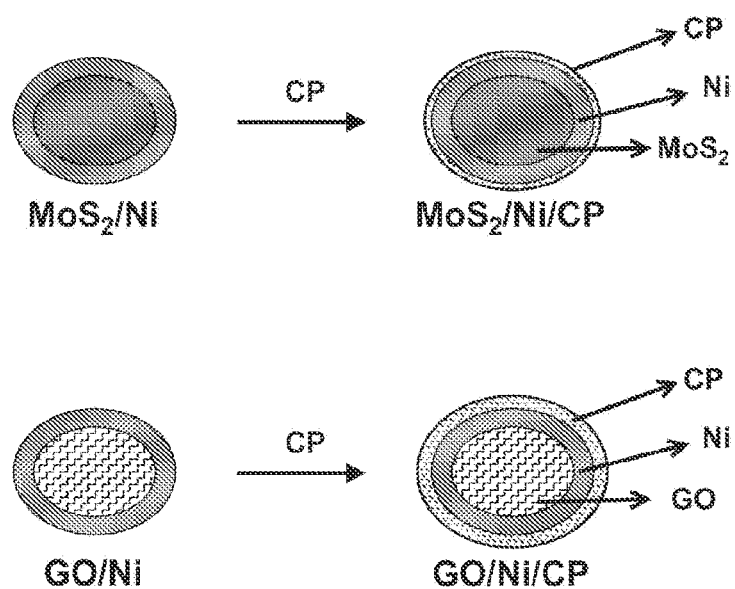
FIG. 2 shows schematic drawings showing the structure of a conducting polymer coating on Ni-coated graphene or Ni-coated $MoS_2$ nanomaterials.

Introduction: This example provides affordable, durable, electrically conductive coatings and material solution for silver paint replacement. The conductive materials include a conducting-2D-polymer materials (graphene or $MoS_2$) based solution. A hybrid core structure of the graphene-containing material and molybdenum disulfide ($MoS_2$) was synthesized by coating with nickel and/or a conducting polymer. FIGS. 1 and 2 show the structure of a conducting polymer, graphene oxide (GO), and $MoS_2$ nanomaterial coated with nickel or silver. The nickel or silver coating of $MoS_2$ or graphene GO can be coated over with a conducting polymer (such as polypyrrole, polythiophene or polyaniline) to provide corrosion resistive highly conducting paste.

The hybrid materials can be exploited for fabrication of hybrid pastes. In particular, the synthesized composites of polymers and nanomaterials have shown enhanced conductivity, corrosion and thermal properties. The graphene has been found to contain high electrical conductivity as well as intrinsic thermal conductivity. For example, the graphene-polyaniline showed conductivity with very high specific capacitance of 300-500 F g$^{-1}$ at a current density of 0.1 A g$^{-1}$. Further, the hybrid coating materials exemplified have shown stability between −65° F. to 250° F. The commercial applications of the developed material can be exploited in airframes, conductive pastes, and silver paints.

General Procedure: Hybrid nanomaterials were synthesized and samples prepared for characterizations. The surface morphology, electrical conductivity, electrochemical and corrosion properties of the samples were then made. The hybrid particles were then combined with a thermoplastic resin and a dispersant to create paste. Electrochemical corrosion measurements of steel with and without the paste were made. The charge transfer resistance of paste samples was then studied through impedance spectroscopy to understand the corrosion inhibition behavior. A model was made based on the experimental results to understand the conductivity of the samples.

Figure 3:
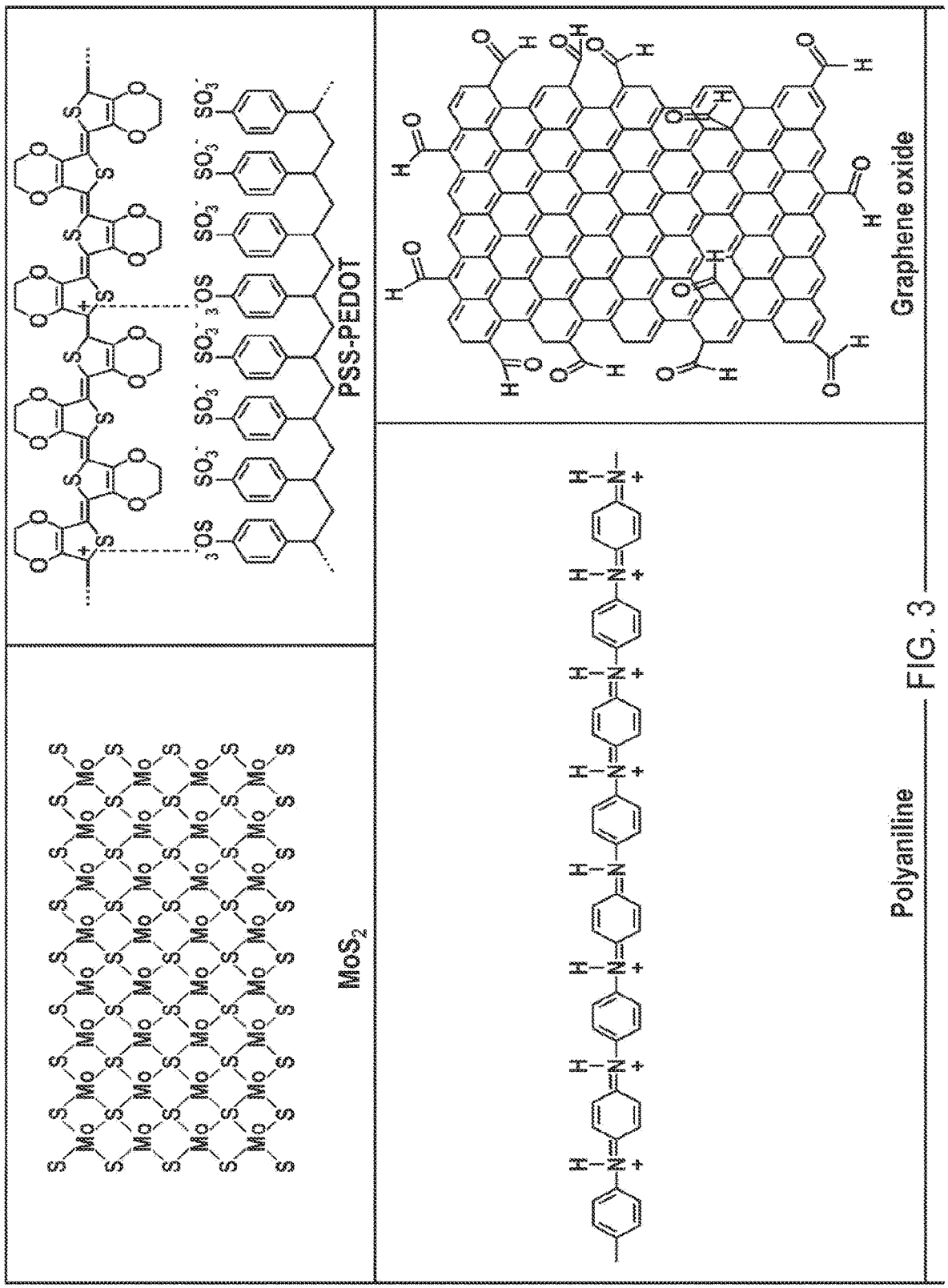
FIG. 3 shows the structure of nanomaterials used in the present disclosure.
Figure 3:
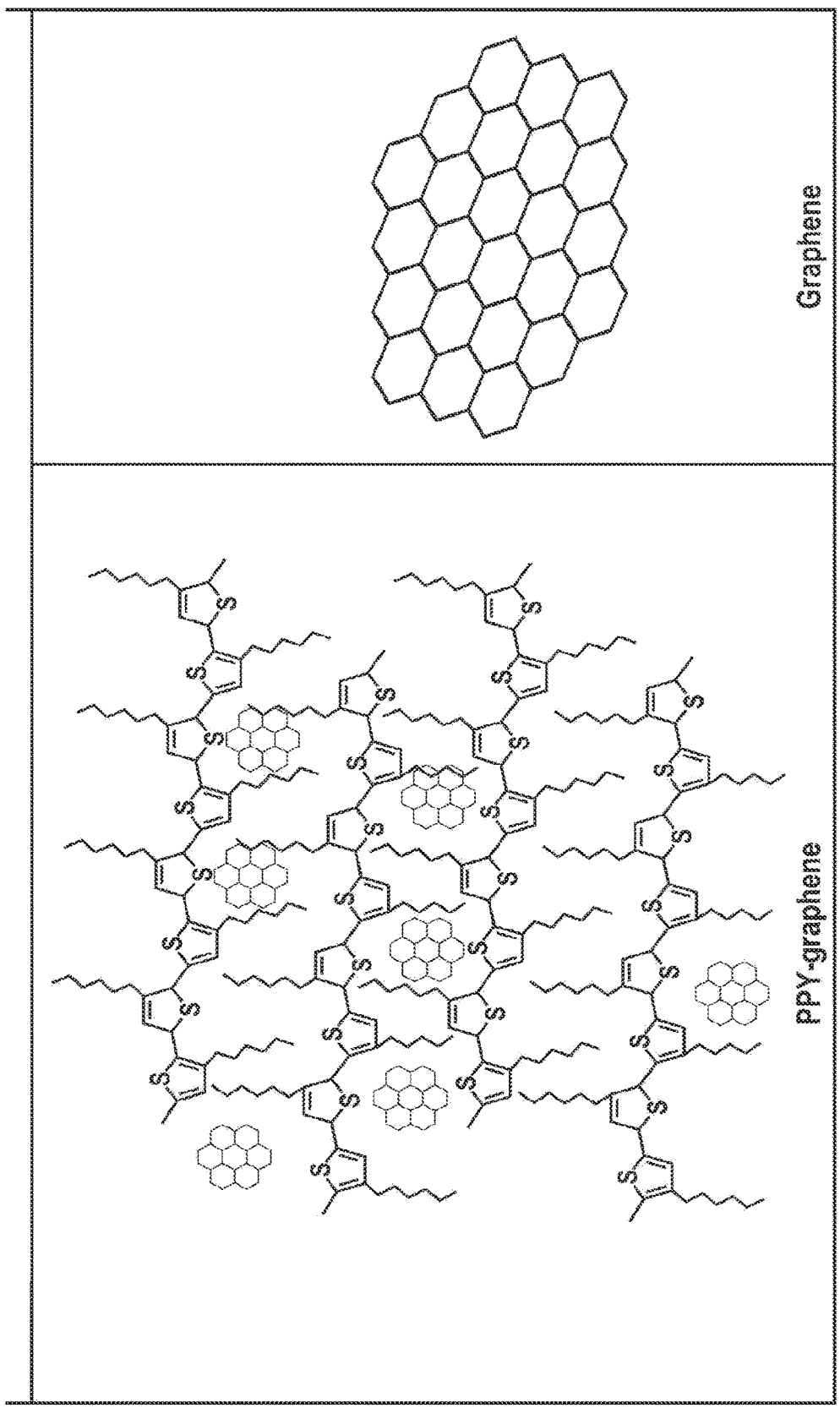

Synthesis nanomaterial, functionalization and characterization: Three nanomaterials (polyaniline, graphene and $MoS_2$) were selected as shown FIG. 3. The graphene was procured commercially, $MoS_2$ was procured commercially or synthesized as described herein, and the polyaniline nanoparticle were synthesized.

Synthesis of $MoS_2$ particles: The $MoS_2$ particles were prepared by varying the water and water and ethylene glycol concentration using a hydrothermal process. In a first process, sodium molybdate ($Na_2MoO_4 \cdot 2H_2O$; 50 mg) was added with thioacetamide ($C_2H_5NS$; 100 mg) to 100 ml of water. The resulting solution was heated at 200° C. for 12 hrs in an autoclave (Teflon lining in stainless steel based cylinder). Nanoparticles of $MoS_2$ was obtained after cleaning by a centrifugation process.

In a process, $MoS_2$ nanoparticles were formed by using ethylene glycol as the primary solvent. A solution was prepared by mixing $Na_2MoO_4 \cdot 2H_2O$ (50 mg) and 40 mg of $C_2H_5NS$ in 40 ml of water and subsequently with 60 ml of ethylene glycol. The solution was heated to 200° C. for 24 hrs. $MoS^2$ was collected using water washing and a centrifugation process.

Synthesis of polyaniline nanoparticles: The polyaniline was made in the presence of a surfactant following the earlier work of Ram et al. Briefly, the monomer aniline, dodecylbenzosulfonic acid, and ammonium persulfate (APS) were mixed at suitable proportion using hydrochloric acid. The polyaniline nanoparticle reaction was left to stand for 24 hrs. The nanoparticles formed were cleaned using a centrifuge and water and later, treated with 1 M HCl to maintain the conductivity.

Figure 4:
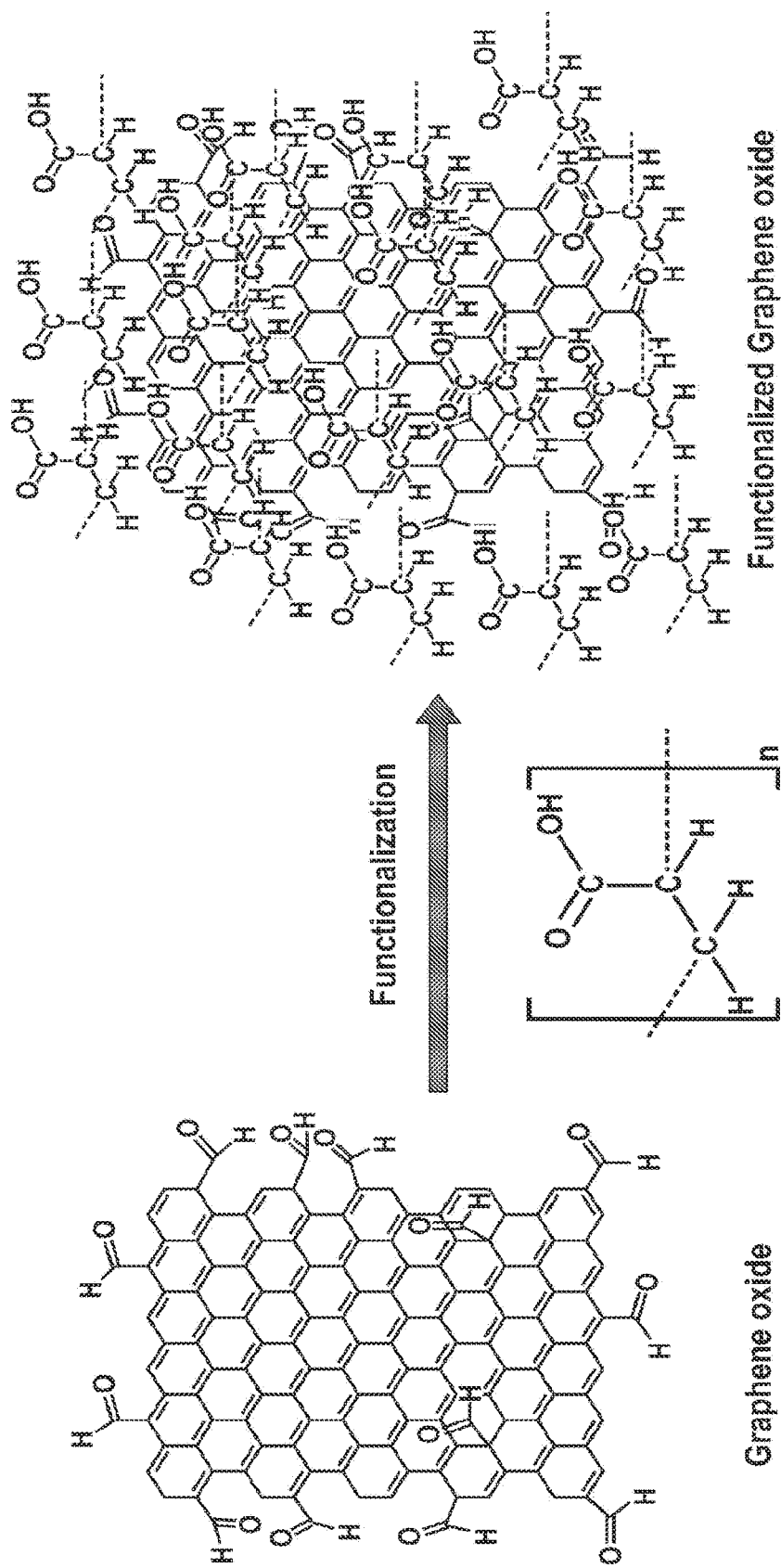
FIG. 4 shows polystyrene sulfonate (PSS) treatment of the nanomaterials, graphene oxide and $MoS_2$.
Figure 4:
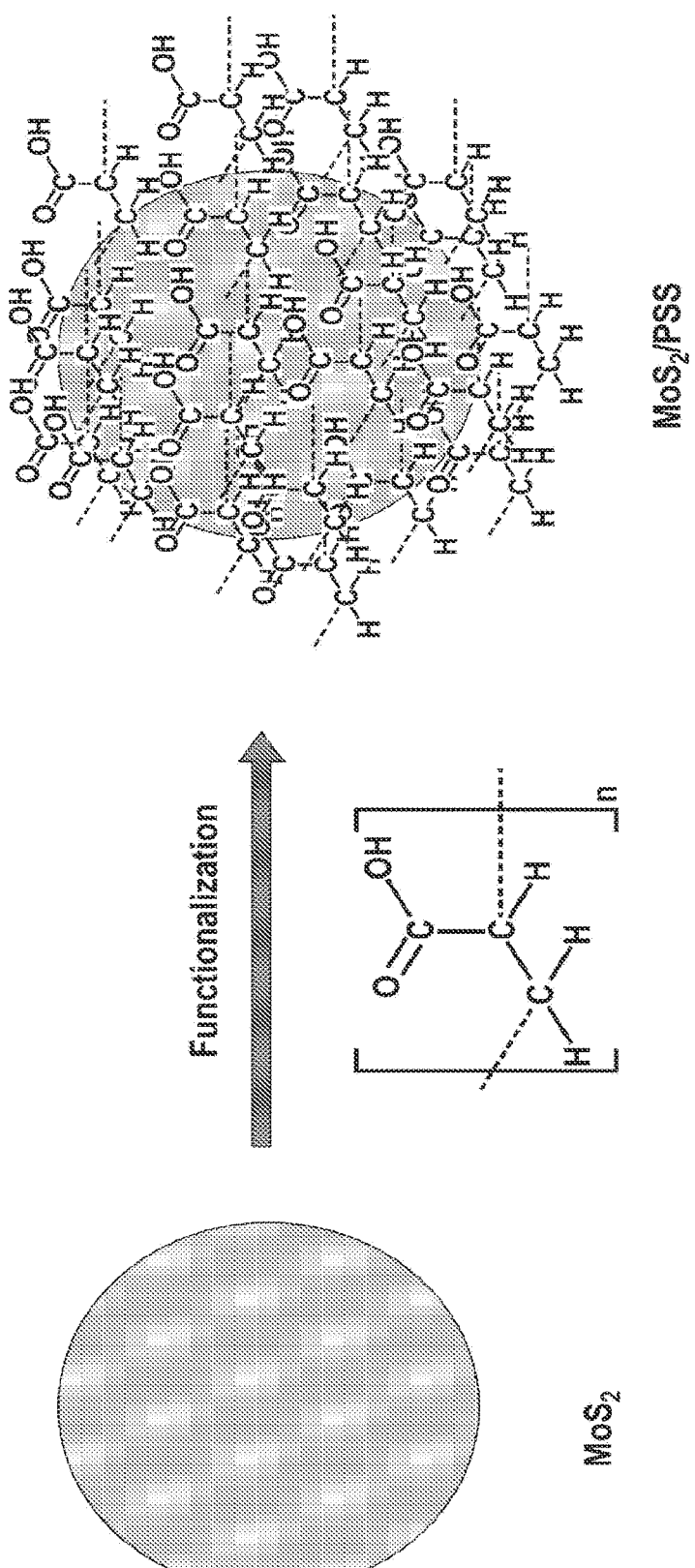

Chemical synthesis of conducting polymer over graphene oxide and $MoS_2$. The nanomaterial (graphene oxide and $MoS_2$) were dispersed in a polyanion such as the sodium salt of polystyrene sulfonate (PSS) so that each particle was functionalized which allows the conducting polymer to be coated. The $MoS_2$/PSS and graphene oxide/PSS particles structures are shown in FIG. 4. The $MoS_2$/PSS and graphene oxide/PSS particles were then dispersed in dodecyl benzene sulfonic acid. Polyaniline was polymerized over the graphene oxide and $MoS_2$ nanoparticles.

Electrochemical deposition of metal or conducting polymer over of nanomaterial using electrochemical technique: A specially designed electrochemical set-up was used in which the container was made of steel and acts as an anode electrode. A potential was applied above the redox potential of the monomer (aniline) or metal (Ni or Ag). $NiCl_2$, $AgNO_3$ or aniline were used to deposit Ni, Ag, and polyaniline, respectively, over the nanoparticle. The solution was stirred after each 1 to 2 minutes. The time period of deposition can be optimized with SEM and conductivity measurements of the deposited particle.

The synthesized hybrid nanomaterials (PANI/Ni, $MoS_2$/Ni/PANI, GO/Ni/PANI. $MoS_2$/Ag, GO/Ag) were characterized using scanning electron microscopy, X-ray diffraction and energy-dispersive (ED) analysis. The conductivity measurement was studied using the two probe method.

Preparation of hybrid material based conducting paste: A conducting paste was formed by mixing amino phenyl epoxy, dicyandiamide, and binder with one of PANI/Ni, $MoS_2$/Ni/PANI, and GO/Ni/PANI. $MoS_2$/Ag, GO/Ag. The binder (vinyl acetate—55 to 70% on monomer basis and ethylene monomers—25 to 40% on monomer basis) was adjusted by measuring the viscosity. The samples prepared for thermal conductivity was cured at 150° C. to remove any solvent. Four point probes were used to measure the conductivity value of the sample using the composition of binder. SEM and FTIR measurements were made to understand the surface and infrared properties of the paste materials.

Preparation of test sample, coupon and characterization: Adhesion tests measurement were made by coating the sample on $Al_2O_3$ substrates. The surface morphology of the film was measured by SEM technique. However, TEM measurement was used to understand the effect of nanomaterial size, its coating as well as dispersion of the material in the paste on the conductivity of the sample.

Corrosion test: Corrosion tests were conducted to characterize the synthesized paste. The paste was coated over a Cu plate by spray coating and the paste was annealed at about 150° C. so that in case of GO the Cu—O bond could be formed which will act as a passivation layer and will work as corrosion inhibitory coating material. The coated sample was studied using cyclic voltammetry and electrochemical impedance spectroscopy (EIS) methods over a period of time while staying in a salt solution. To accelerate the test and obtain results similar to long term tests, a biasing voltage was applied to the sample. The Tafel equation and impedance properties were made over the sample for corrosion properties. After the characterization, the data was analyzed to find the corrosion rate, charge transfer rate, and stability. The impedance results were modeled to find the circuit equivalent model of the electrochemical interface between the paste layer and the electrolyte. The values of the components in the model give more detail on properties of the paste for optimizing the composite material. After, the harsh corrosion tests the morphology of the samples were studied using scanning electron microscopy.

In depth conductivity before and after the soak test on samples were performed. The corrosion test was performed initially at salt-fog exposures. The compatibility test of the coated film with substrates along with theoretical model was studied.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A particle comprising a nanoparticle core selected from a graphene-containing material, a dichalcogenide material, or a combination thereof and a shell at least partially surrounding the core, wherein the shell comprises a conducting polymer, wherein the nanoparticle core material is functionalized with a polyanion.

2. The particle of claim 1, wherein the polyanion is a salt of polystyrene sulfonate.

3. The particle of claim 1, wherein the nanoparticle core is selected from a graphene-containing material or a dichalcogenide material.

4. The particle of claim 1, wherein the graphene-containing material is selected from graphene, graphene oxide, carbon nanoparticle, or a combination thereof.

5. The particle of claim 1, wherein the core comprises the dichalcogenide material selected from molybdenum disulphide, molybdenum diselenide, molybdenum ditelluride, tungsten disulphide, tungsten diselenide, tungsten ditelluride, titanium diselenide, titanium disulphide, titanium ditelluride, zirconium disulphide, zirconium diselenide, zirconium ditelluride, tin disulphide, tin diselenide, tantalum disulphide, tantalum diselenide, vanadium tantalum ditelluride, or a combination thereof.

6. The particle of claim 1, wherein the particle comprises the conducting polymer selected from polyaniline, polypyrrole, polythiophene, polyethylenedioxythiophene, poly (ortho-anisidine), poly (methyl aniline), poly(o-ethoxyaniline), poly (o-toluidine), poly (ethoxy-aniline), substituted polyaniline, substituted polypyrrole, polyindole, polycarbazole, substituted polycarbazole, polyaniline-polypyrrole copolymers, polyaniline-polythiophene copolymers, blends thereof, or copolymers thereof.

7. The particle of claim 1, wherein the particles have an average particle size of 50 nm to 10 microns.

8. A composition comprising the particle of claim 1.

9. The composition according to claim 8, wherein the particle is present in an amount of 50-90 wt % of the composition.

10. The composition of claim 9, further comprising a dispersant, an adhesive material, or a combination thereof.

11. The composition of claim 10, wherein the adhesive material includes an epoxy resin, a vinyl ester resin, a polystyrene resin, an acrylic resin, a polyamide resin, a polyamide-amine resin, a carboxyl group-containing resin, or a combination thereof.

12. The composition according to claim 10, wherein the adhesive is present in an amount of 10-50 wt % of the composition.

13. The composition of claim 10, wherein the composition is a conductive paste.

14. The composition of claim 10, wherein the composition exhibits an electrical resistivity of at least $13 \times 10^{-5}$ ohm·cm, a thermal conductivity of at least 8 W/mK, and chemical stability at room temperature.

* * * * *